United States Patent [19]

Ito et al.

[11] Patent Number: 4,858,499
[45] Date of Patent: Aug. 22, 1989

[54] AUTOMATIC TRANSMISSION WITH LOCK-UP CLUTCH

[75] Inventors: Yasunobu Ito; Kenji Suzuki, both of Anjo, Japan

[73] Assignee: Aisin-Warner Kabushiki Kaisha, Anjo, Japan

[21] Appl. No.: 179,950
[22] PCT Filed: Jun. 30, 1987
[86] PCT No.: PCT/JP87/00441
  § 371 Date: Feb. 22, 1988
  § 102(e) Date: Feb. 22, 1988
[87] PCT Pub. No.: WO88/00307
  PCT Pub. Date: Jan. 14, 1988

[30] Foreign Application Priority Data

Jun. 30, 1986 [JP] Japan .................................. 61-154332

[51] Int. Cl.[4] .............................................. B60K 41/06
[52] U.S. Cl. ..................................... 74/866; 192/3.31; 74/733
[58] Field of Search ................ 74/866, 731, 732, 733; 192/0.052, 3.31, 3.58; 364/424.1

[56] References Cited

U.S. PATENT DOCUMENTS

| | | | |
|---|---|---|---|
| 4,298,105 | 11/1981 | Duhaime | 192/3.31 X |
| 4,431,095 | 2/1984 | Suga | 192/3.31 |
| 4,448,293 | 5/1984 | Maeda | 192/3.31 X |
| 4,463,842 | 8/1984 | Redzinski | 192/3.31 X |
| 4,539,869 | 9/1985 | Suga et al. | 74/866 |
| 4,640,394 | 2/1987 | Higashi et al. | 192/3.58 X |
| 4,655,330 | 4/1987 | Nishikawa et al. | 192/3.31 X |
| 4,660,440 | 4/1987 | Matsumura et al. | 74/866 |
| 4,693,347 | 9/1987 | Nishikawa et al. | 74/3.31 X |
| 4,715,145 | 12/1987 | Takeda et al. | 74/866 X |

FOREIGN PATENT DOCUMENTS

| | | | |
|---|---|---|---|
| 56-39354 | 4/1981 | Japan | 192/0.052 |
| 60-256675 | 12/1985 | Japan | . |
| 61-27364 | 2/1986 | Japan | . |
| 61-27365 | 2/1986 | Japan | . |

Primary Examiner—Dwight G. Diehl
Attorney, Agent, or Firm—Varndell Legal Group

[57] ABSTRACT

In an automatic transmission equipped with a lock-up clutch (6) capable of transmitting engine power to the automatic transmission (1) directly or via a torque converter (2), the automatic transmission has sensors (11, 12) for detecting an input rotational speed and an output rotational speed of the transmission, a control system including a shift start determination step (66) for judging start of a shift by comparing a ratio of the input rotational speed to the output rotational speed with a gear ratio prevailing prior to a shift and a shift end determination step (68) for judging end of a shift by comparing the ratio of the input rotational speed to the output rotational speed with a gear ratio prevailing after a shift, and a lock-up solenoid (10) responsive to output signals from the shift start determination step and shift end determination step for releasing the lock-up clutch (6) during a shift. Thus, proper control of the lock-up clutch at the time of a gear shift can be carried out even in the same type of transmission and even under all shift conditions, and shock such as racing of the engine or a shift executed with the lock-up clutch in the engaged state can be prevented.

2 Claims, 9 Drawing Sheets

AUTOMATIC TRANSMISSION WITH LOCK-UP CLUTCH

DESCRIPTION

1. Technical Field

This invention relates to an automatic transmission with a lock-up clutch in which the lock-up clutch is released during a shifting operation in order to improve the feeling of the shifting operation.

2. Background Art

In a system having a lock-up clutch arranged within a torque converter connected between an engine and an automatic transmission for transmitting the power of the engine directly to the transmission under predetermined conditions, the lock-up clutch generally is engaged or disengaged based on a shift pattern set for each range of gear positions. More specifically, in order to improve fuel economy, control is exercised in such a manner that the lock-up clutch is released to transmit engine power to the transmission via the torque converter if throttle opening and vehicle velocity are in a torque conversion region of a shift pattern, and in such a manner that the lock-up clutch is engaged to transmit motor power directly to the transmission if throttle opening and vehicle velocity are in a lock-up region of the shift pattern.

However, in a shift pattern set for each range of gear position, lock-up regions adjoin about shift points at the boundaries. Therefore, when the accelerator pedal is depressed by a great amount so that the automatic transmission is operating under a large throttle opening, gears are shifted while the locked up state remains in effect. As a result, a large speed-change shock is produced.

Conventionally, the system shown in FIG. 8 is employed in order to eliminate speed-change shock. Specifically, in an electronic control unit of the automatic transmission, a shift is determined at time $t_1$ and, after an elapsed time of $T_1$, a shift signal is delivered to a shift solenoid at a time $t_2$. However, owing to a response delay in the hydraulic system, the actual shift starts upon passage of a time $T_2$. Accordingly, the time period $T_2$ is preset, the lock-up clutch is released at a time $t_3$ to prevent the occurrence of speed-change shock, and the lock-up clutch is re-engaged at a time $t_4$, at which the shift ends, upon elapse of a time period $T_3$. The time periods $T_1$, $T_2$, $T_3$ involving the shift signal and the signals for engaging and disengaged the lock-up clutch are stored in advance by a timer within a computer, and control of the gear shift and lock-up clutch timing is performing based on the timer.

As indicated in Japanese Patent Application Laid-Open No. 61-27365, a system has been disclosed in which engine rotational speed following issuance of a shift command is monitored and the start of a shift is determined when the rate of change in rotational speed surpasses a set value. In other words, the amount of engine racing at the time of a gear shift is fed back and the lock-up clutch is released when the integrated value of the feedback exceeds a set value. In other words, as shown in FIG. 9, at the moment $t_2$ a rate of change $dN_E/dt$ in engine rotational speed surpasses a set value $\Delta N$ following an instant $t_1$ at which a shift command is issued, lock-up is suspended by an output duty of 0% and the suspension continues for a set time period T1. If the lock-up region still prevails after this time, the output duty D is abruptly made $D_A\%$ and is then gradually raised to 100% at a slope $a/T2$, so that the torque converter can be returned to the lock-up state. By deciding the set value $\Delta N$ of the rate of change in engine rotational speed on the basis of the rate of change in engine rotational speed after issuance of the shift command, namely by setting $\Delta N$ to a value obtained by multiplying the maximum value thereof by a safety factor $\beta$, speed-change shock due to suspension of lock-up is prevented.

Further, as illustrated in Japanese Patent Application Laid-Open No. 61-27364, a system is disclosed in which the lock-up clutch is released upon discriminating the degree to which a shift has progressed after issuance of a shift command using the rotational speed of the torque converter prior to the shift and the gear ratio prior of the shift as references. More specifically, as shown in FIG. 10, timing for starting control of lock-up suspension is decided depending upon whether the rotational speed N of the torque converter has attained a reference value $N_c$ obtained based upon the rotational speed $N_b$ of the torque converter at the start of a shift.

However, in the system in which timing control of the shift and lock-up clutch is carried out based on the timer, once the timer has been set, the set time is the same in transmissions of the same type and under all shift conditions. Therefore, temporal disparaties relating to shift and lock-up control arise due, for example, to differences in piston stroke in the friction devices and differences in orifice diameter in the hydraulic circuitry. Also, depending upon changes with time, shock such as racing of the engine or a shift executed with the lock-up clutch in the engaged state occur.

The system disclosed in the aforementioned Japanese Patent Application Laid-Open No. 61-27364 also has a problem. Depending upon the travelling conditions of the vehicle (e.g. whether the vehicle is travelling on an upgrade or downgrade or a hauling a load, etc.), the state of vehicle acceleration changes even for the same throttle opening, engine rotational speed and torque converter rotational speed. As a result, the input rotational speed of the torque converter during a shifting operation changes is various ways according to the travelling conditions. When such is the case, it is difficult to detect the start of a shift and the progress of the shift based solely on the input rotational speed of the torque converter or the like.

Furthermore, owing to disparities in oil temperature and engaging elements, there is a response delay in making a transition from the fully engaged state of the lock-up clutch so that the clutch is not always released instantaneously even though a lock-up release signal is issued in the course of a gear shift. Thus, there is the possible that transmission shock will occur. In addition, fully releasing the lock-up clutch during a shift will not completely suppress engine racing and speed-change shock, particularly in a region where torque converter slip is large, even if the timing of the release is synchronized to the shift by the above-described conventional method.

Also, with regard to engagement of the lock-up clutch when a shift ends, it is difficult to prevent the occurrence of speed-change shock caused by a disparity in the moment a shift ends since the time setting in the above-described system is made by the timer.

The present invention seeks to solve the foregoing problems and its object is to provide an automatic transmission having a lock-up clutch in which it is possible to correctly judge the start and end of a gear shift based on the input rotational speed and output rotational speed of the automatic transmission, with the lock-up clutch being controlled by feeding back signals indicative of the judgments made, thereby improving the feeling of the gear shift.

DISCLOSURE OF THE INVENTION

In order to attain the foregoing object, an automatic transmission with a lock-up clutch according to the present invention is characterized in that, in an automatic transmission equipped with a lock-up clutch capable of transmitting engine power to the automatic transmission directly or via a torque converter, the automatic transmission comprises detecting means for detecting an input rotational speed and an output rotational speed of the transmission, shift start determination means for judging start of a shift by comparing a ratio of the input rotational speed to the output rotational speed with a gear ratio prevailing prior to a shift, shift end determination means for judging end of a shift by comparing the ratio of the input rotational speed to the output rotational speed with a gear ratio prevailing after a shift, and a lock-up solenoid responsive to output signals from the shift start determination means and shift end determination means for releasing the lock-up clutch during a shift. In another aspect, the automatic transmission is characterized by having a lock-up solenoid responsive to output signals from the shift start determination means and shift end determination means for controlling the lock-up clutch so that the lock-up clutch is capable of assuming a standy state, sweep state or slip state during a shift.

Thus, in accordance with the invention, the lock-up clutch is controlled by comparing the ratio of the input rotational speed of the automatic transmission to the output rotational speed thereof during a shift with the gear ratio before the shift, and accurately determining the beginning and end of the shift. Therefore, proper control of the lock-up clutch at the time of a gear shift can be carried out even in the same type of transmission and even under all shift conditions, and shock such as racing of the engine or a shift executed with the lock-up clutch in the engaged state can be prevented.

In a case where the lock-up clutch is controlled so as to assume a standby state, sweep state or slip state between the start and end of a gear shift, the lock-up clutch can be made to respond immediately and can be made to engage or disengage smoothly to further enhance the feeling of the gear shifting operation.

BEST MODE FOR CARRYING OUT THE INVENTION

Figure 1:
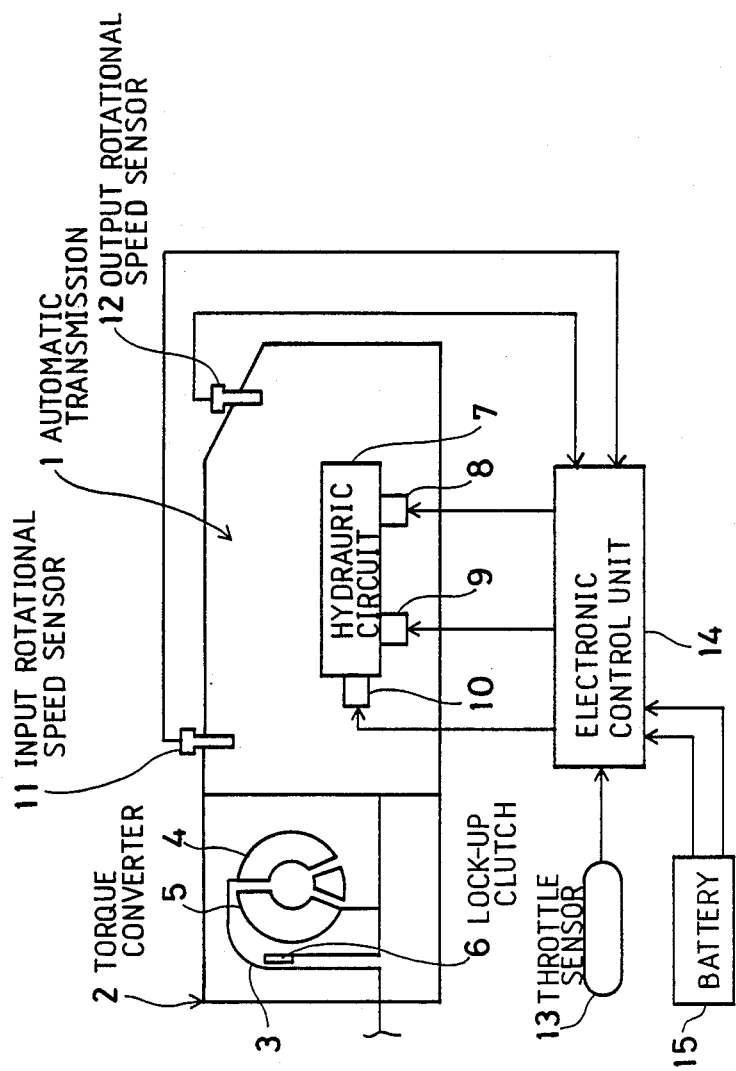
FIG. 1 is a conceptual view of an automatic transmission with lock-up clutch in accordance with the present invention.

In FIG. 1, an automatic transmission 1 has a torque converter 2 as a first stage. The torque converter 2 is equipped with a pump impeller 4, a turbine runner 5 and a lock-up clutch 6 within a housing 3. In the torque conversion region of a shift pattern, the lock-up clutch 6 is freed from the housing 3 so that power from the engine is transferred to the automatic transmission 1 via the pump impeller 4 and turbine runner 5. In the lock-up region, the lock-up clutch 6 is engaged with the housing 3, so that the power from the engine is transferred to the automatic transmission 1 via the housing 3.

The automatic transmission 1 comprises a well-known planetary gear group and a friction device (not shown) for fixing or freeing each of the elements of the planetary gears. Travel is made possible in the optimum gear by selectively actuating the elements of the friction device automatically via a hydraulic circuit 7 in dependence upon the travelling state of the vehicle. The hydraulic circuit 7 is provided with a shift solenoid (No. 1) 8, a shift solenoid (No. 2) 9 and a lock-up solenoid 10. On the basis of a combination of on/off signals applied to the shift solenoid (No. 1) 8 and shift solenoid (No. 2) 9, the elements of the aforementioned friction device are selectively actuated to shift speeds. The lock-up solenoid 10 is a duty solenoid controlled via computer by e.g. a 50 Hz ON-OFF signal. By changing the proportion of the ON time (the duty ratio) of the ON-OFF signal, it is possible to control the engagement, slip and release of the lock-up clutch 6. The solenoids 8, 9 and 10 are controlled by an electronic control unit 14 on the basis of signals from a sensor which senses the input rotational speed of the automatic transmission, a sensor 12 which senses the output rotational speed of the automatic transmission, and an engine throttle opening sensor 13. The electronic control unit 14 is supplied with a constant voltage from a battery 15.

Figure 2:
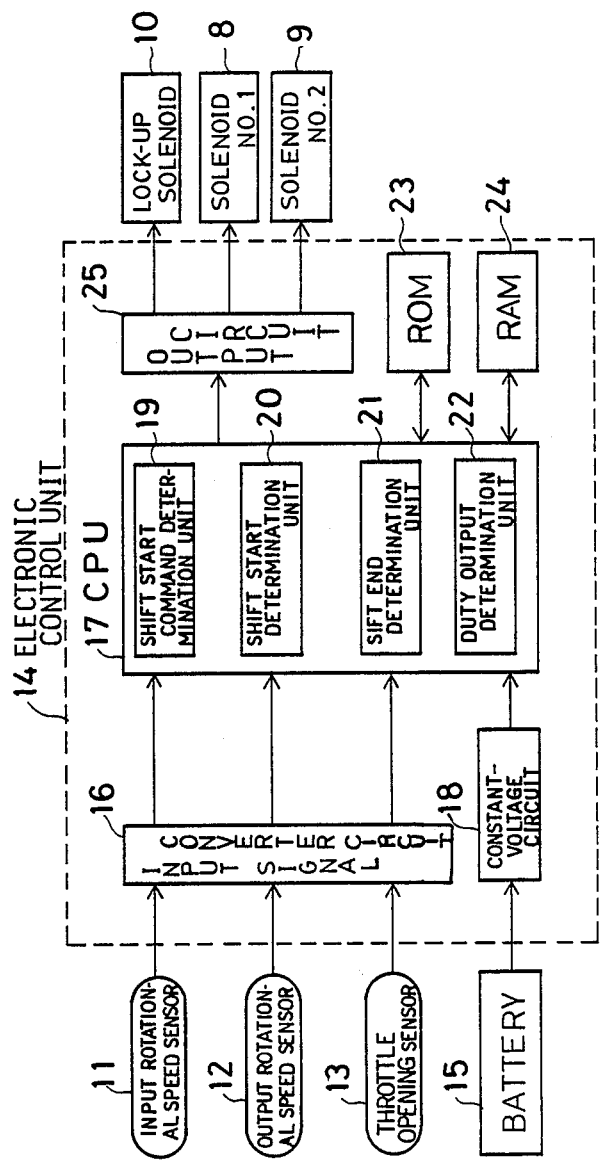
FIG. 2 is a block diagram illustrating a first embodiment of a control system according to the present invention.

An embodiment of the electronic control unit 14 shown in FIG. 1 will now be described with reference to FIG. 2. The signals from the automatic transmission input rotational speed sensor 11, output rotational speed sensor 12 and engine throttle opening sensor 13 are inputted to a CPU 17 through an input signal converter circuit 16, and the CPU 17 is supplied with the constant voltage from the battery 15 through a constant-volage circuit 18. The CPU 17 has shift start command determination unit 19, a shift start determination unit 20, a shift end determination unit 21 and a duty output determination unit 22. A control program and various determination tables are stored in a ROM 23, and a RAM 24 is provided with a working area. On the basis of the control program and determination tables, the CPU 17 performs predetermined processing and makes decisions based on the input signals and outputs control signals to the shift solenoid (No. 1) 8, shift solenoid (No. 2) 9 and lock-up solenoid 10 via an output circuit 25.

The flow of processing executed by the CPU 17 will now be described with reference to FIGS. 3 and 4.

Figure 3:
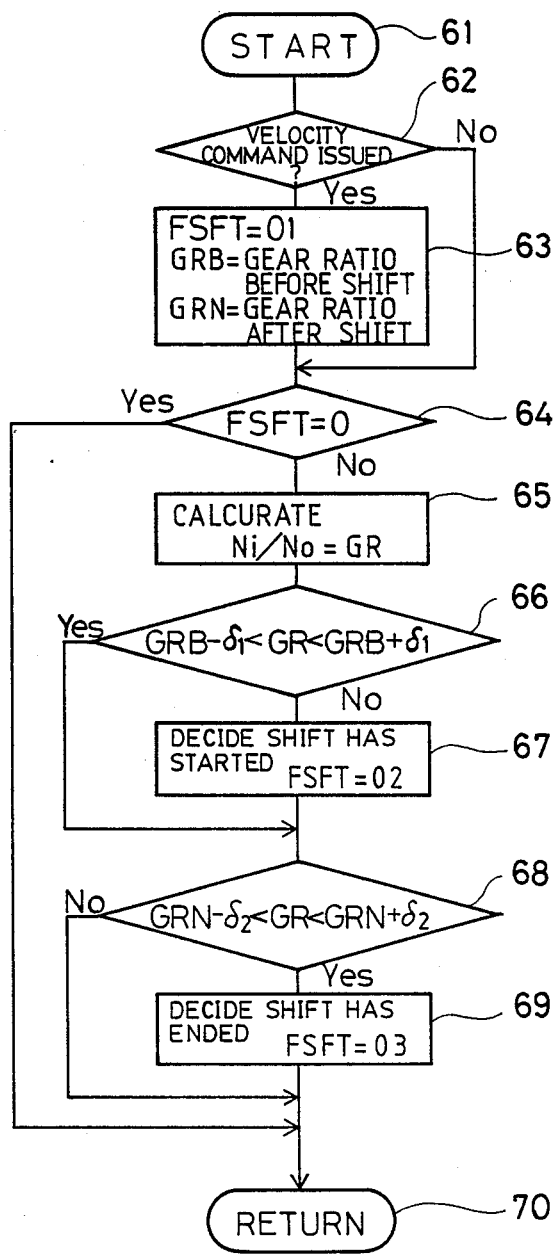
FIGS. 3 and 4 are views illustrating an embodiment of the flow through which the lock-up clutch of the invention is control FIGS. 5 and 6 views illustrating an embodiment of the flow through which the lock-up clutch of the invention is controlled.

The main routine of FIG. 3 is executed at all times during travelling of the vehicle. When the program is started at a step 61, it is determined at a step 62 whether a shift start command has been issued. The shift start command is issued in a separate gear shift program. A shift flag FSFT is set to 0 or 01 depending upon whether the present travelling conditions are such that there is a change in a shift region in the shift pattern stored in the ROM. If a shift start command has not been issued, the program proceeds to a step 64. If this command has been issued, the program proceeds to a step 63.

At the step 63, the shift flag FSFT is set to 01 and a gear ratio GRB before a shift and a gear ratio GRN after a shift are read in from the ROM. Next, it is determined at a step 64 whether the shift flag FSFT is 0. If FSFT is 0, then the program proceeds to a step 70. If FSFT is not 0, the program proceeds to a step 65, at which the input rotational speed Ni and output rotational speed No of the transmission are read in and the present gear ratio GR=Ni/No of the transmission is calculated. Next, a step 66 calls for a determination as to whether the present gear ratio GR resides within a fixed range of $\pm\delta_1$ of the gear ratio GRB before a shift. If the GR does reside within this fixed range, it is judged that a shift has not yet started and the program proceeds to a step 68. When the present gear ratio GR falls outside the fixed range of the gear ratio GRB before a shift while this routine is being repeated, the program proceeds to a step 67, at which it is judged that a shift has started and the shift flag FSFT is set to 02.

The step 68 calls for a determination as to whether the present gear ratio GR resides within a fixed range of $\pm\delta_2$ of the gear ratio GRN after a shift. If Gr is outside this fixed range, it is judged that a shift has not yet ended and the program proceeds to the step 70. When the present gear ratio GR falls within the fixed range of the gear ratio GRN after a shift while this routine is being repeated, the program proceeds to a step 69, at which it is judged that a shift has ended and the shift flag FSFT is set to 00. Thereafter, the above-described routine is executed repeatedly.

Figure 4:
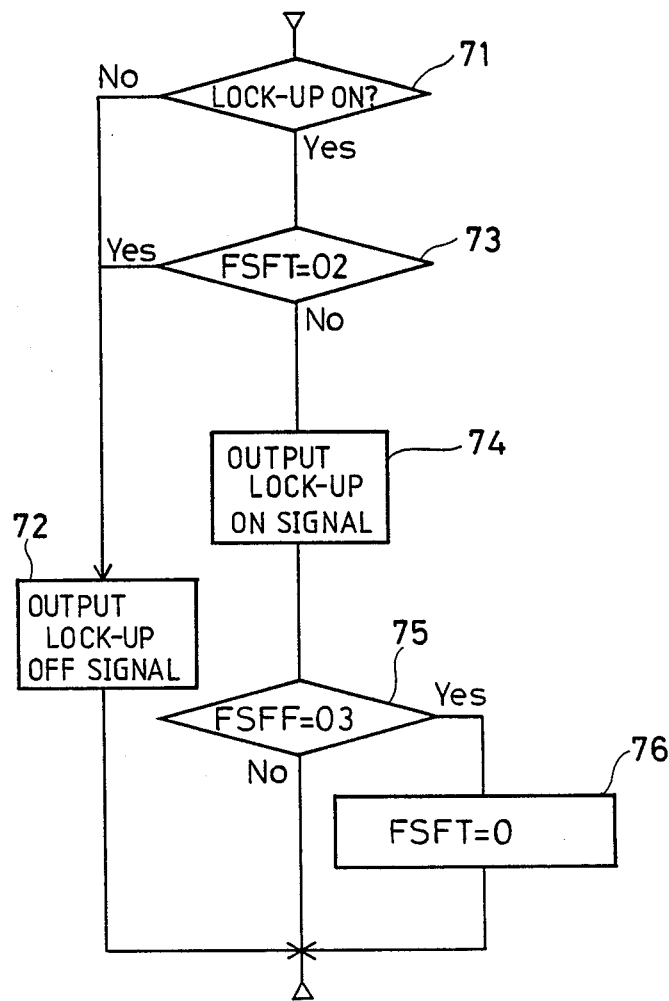

The routine of FIG. 4 is called in the main routine or is executed with an interrupt at fixed time intervals determined by a timer. First, it is determined at a step 71 whether the lock-up region of a shift pattern is prevailing. If the prevailing region is not the lock-up region, then the program proceeds to a step 72, at which the lock-up clutch is maintained in a completely disengaged state. If the lock-up region is prevailing, then the program proceeds to a step 73, at which it is determined whether the transmission flag FSFT is 01. If FSFT is 01, namely if the start of a shift has been determined, the program proceeds to a step 72, at which a signal releasing the lock-up clutch is outputted to the lock-up solenoid. If it has been determined that a shift has not started, the program proceeds to a step 74, at which a signal for engaging the lock-up clutch is outputted to the lock-up solenoid. This is followed by a step 75, at which it is determined whether the shift flag FSFT is 03. If FSFT is not 03, namely if a shift has not ended, then the abovementioned routine is executed when called within the next cycle of the main routine or when an interrupt is generated. When a shift ends, the program proceeds to a step 76, at which the shift flag FSFT is made 0. Thereafter, the foregoing routine is executed repeatedly.

Figure 5:
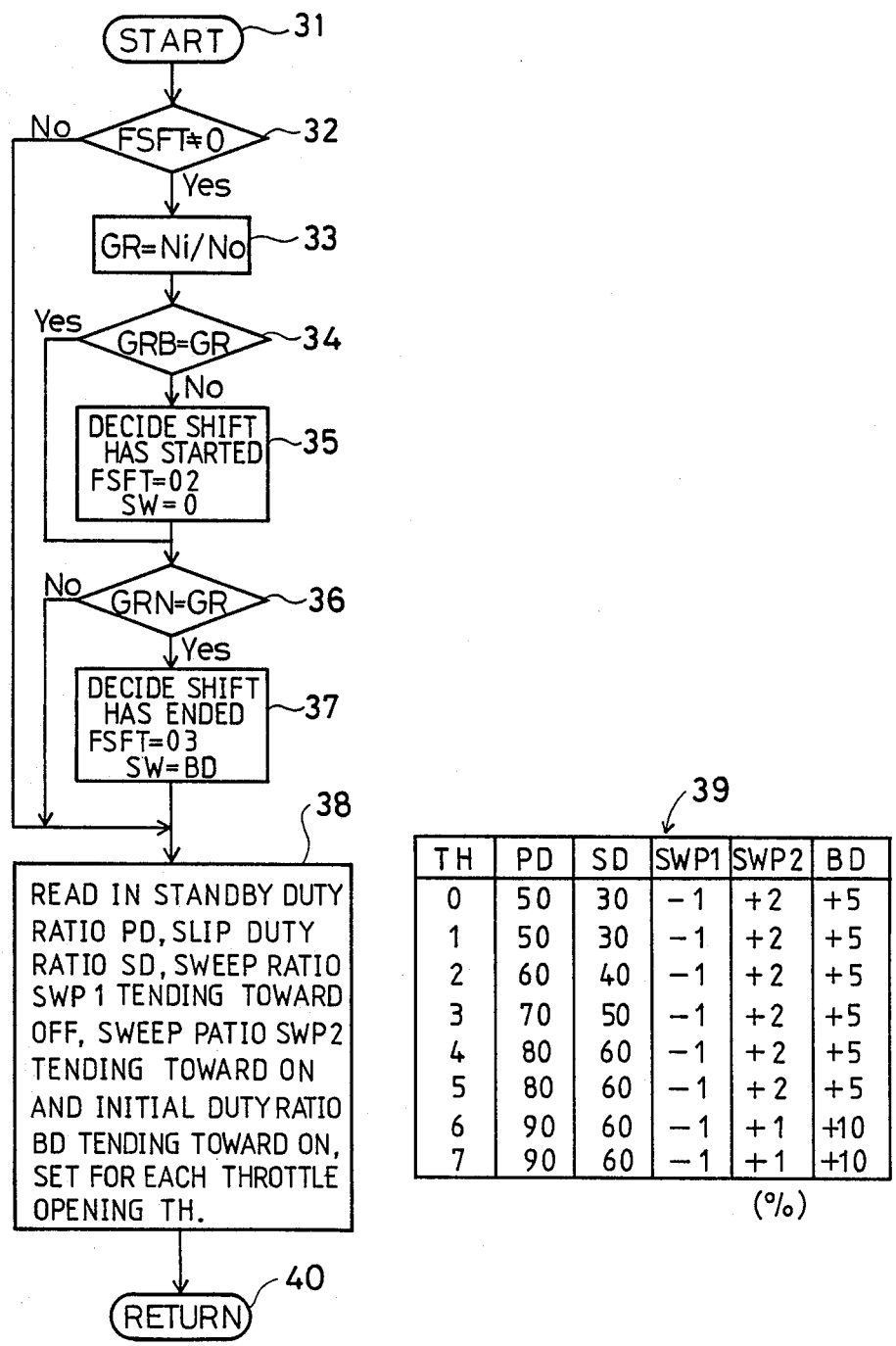

Another embodiment illustrated in FIGS. 5 and 6 will now be described. The routine of FIG. 5 is executed at all times while the vehicle is travelling. When the program is started at a step 31, it is determined at a step 32 whether the shift flag FSFT, which is set to 0 if a shift start command has not been issued, is not 0. The shift start command is issued in a separate shift program. The shift flag FSFT is set to 0 or 01 depending upon whether the present travelling conditions are such that there is a change in a shift region in the shift pattern stored in the ROM. If the shift flag FSFT is 0, namely if a shift start command has not been issued, the program proceeds to a step 38. If this command has been issued, the program proceeds to a step 33.

At step 33, the input rotational speed Ni and output rotational speed No of the transmission are read in and the present gear ratio GR=Ni/No of the transmission is calculated. The next step 34 calls for a determination as to whether the present gear ratio GR is equal to the gear ratio GRB before a shift. If it is equal, it is judged that a shift has not yet started and the program proceeds to a step 36. When the present gear ratio GR becomes non-equal to the gear ratio GRB before a shift while this routine is being repeated, the start of a shift is determined to have occurred at a step 35, the shift flag FSFT is made 02 and SW, described below, is made 0.

A step 36 calls for a determination as to whether the present gear ratio GR is equal to the gear ratio GRN after a shift. If it is not equal, it is judged that a shift has not yet ended and the program proceeds to a step 38. When the present gear ratio GR becomes equal to the gear ratio GRN after a shift while this routine is being repeated, the end of a shift is determined to have occurred at a step 37, the shift flag FSFT is made 03 and a value BD is inserted in SW, described below.

The decisions that a shift has started and ended will now be described in detail. In the case of an upshift, the decision that a shift has been started is made when $Ni/No \leq K1 \times GRB$ holds (where K1 is a coefficient of e.g. 0.9), and the decision that a shift has been ended is made when $Ni/No \leq K2 \times GRN$ holds (where K2 is a coefficient of e.g. 1.1). In the case of a downshift, the decision that a shift has been started is made when $Ni/No \leq K1 \times GRB$ holds (where K1 is a coefficient of e.g. 1.1), and the decision that a shift has been ended is made when $Ni/No \leq K2 \times GRN$ holds (where K2 is a coefficient of e.g. 0.9).

At the step 38, a standby duty ratio PD, a slip duty ratio SD, a sweep ratio 3SWP1 for when the lock-up clutch is directed toward the released (OFF) state, a sweep ratio SWP2 for when the lock-up clutch is directed toward the engaged (ON) state, and an initial duty BD for a case where the lock-up clutch is directed toward the engaged state, all of which are set for every throttle opening TH, are read in. These numerical values are stored beforehand in the ROM 23 in the form shown in table 39. The program proceeds from the step 38 to a step 40 and the above-described loop is repeated, whereby various input information is constantly read in.

Figure 6:
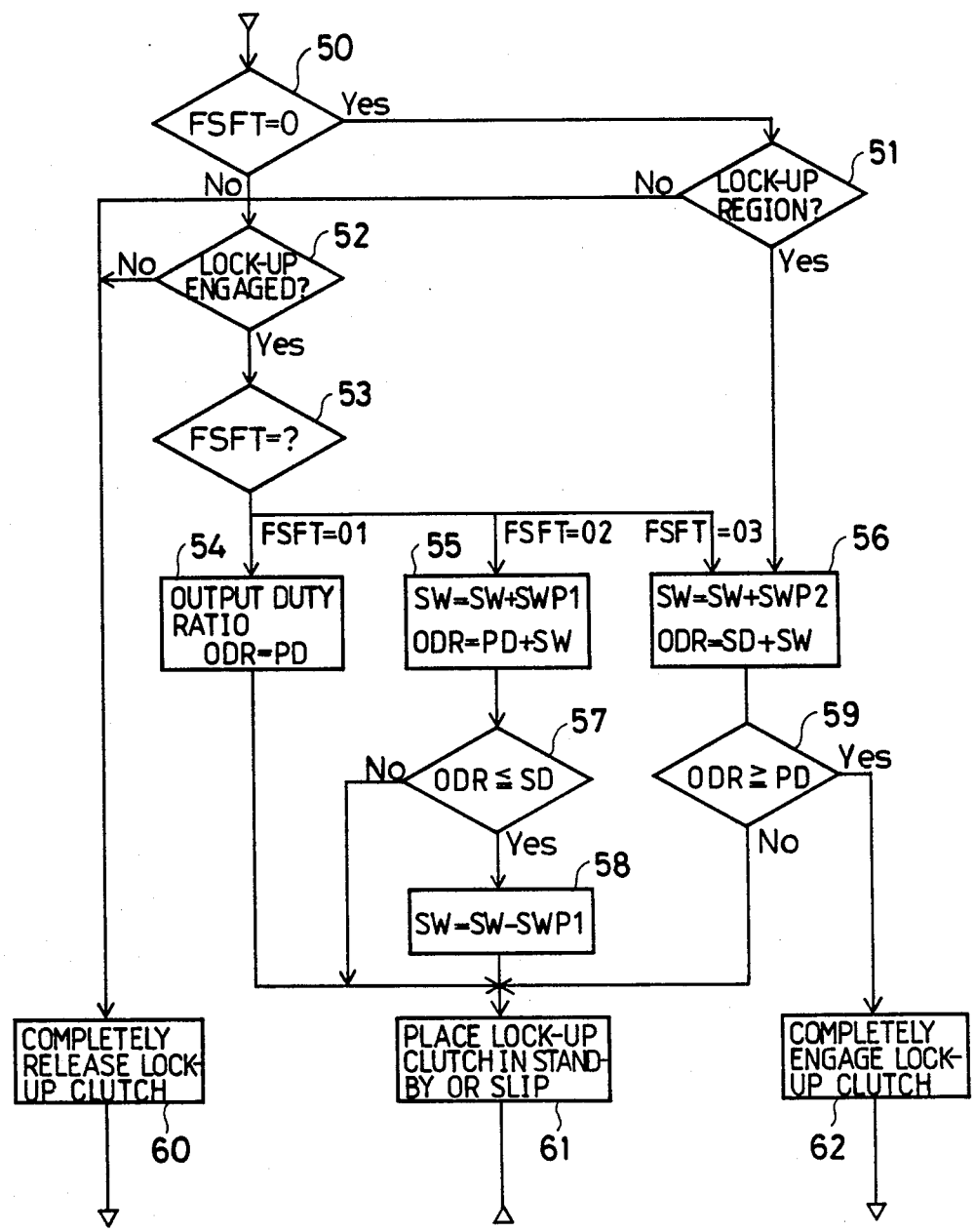

The routine of FIG. 6 is executed with an interrupt at fixed time intervals determined by a timer. First, it is determined at a step 50 whether the shift flag FSFT is 0. If FSFT is 0, namely if a shift start command has not been issued, the program proceeds to a step 51, at which it is determined whether the lock-up region of a shift pattern is prevailing. If the prevailing region is not the lock-up region, the program proceeds to a step 60, at which the lock-up clutch is maintained in the completely disengaged state. If the lock-up region is prevailing, the program proceeds to a step 56, at which the lock-up clutch is engaged at a sweep ratio directing the clutch toward the engaged (ON) state, as will be described below.

If FSFT is not 0 at the step 50, namely if the shift command has been issued, it is determined at a step 52 whether the prevailing region is the lock-up region of a shift pattern. If it is not the lock-up region, the program proceeds to a step 60, at which the released state of the lock-up clutch is maintained and the usual shift program is executed. If the lock-up region is prevailing, then the state of the shift flag FSFT is discriminated at a step 53.

The program proceeds to a step 54 if the shift flag FSFT illustrated in FIG. 5 is found to be 01 at the step 53, to a step 55 if the flag is found to be 02, and to a step 56 if the flag is found to be 03. When the step 54 is selected, output duty ratio ODR is made the standby duty ratio PD corresponding to the throttle opening. This is followed by a step 61, a signal is delivered to the lock-up solenoid to, whereby the lock-up clutch is made to standby in a state in which it may be actuated in the release direction at any time.

If the step 55 is selected, namely if start of a shift has been determined, the sweep ratio SWP1 for when the lock-up clutch is directed toward the released (OFF) state is read in, SW=SW+SWP1 is evaluated and the output duty ratio ODR is made PD+SW. This is followed by a step 57, at which it is determined whether ODR has attained the slip duty ratio SD. If SD has not been attained, a signal is delivered as the output duty ratio ODR to the lock-up solenoid at the step 61, so that the lock-up clutch is swept in the release direction. Each time this loop is executed at a fixed time interval, the sweep ratio SWP1 is added to perform the operation SW=SW+SWP1. When ODR attains the slip duty ratio SD at the step 57, the program proceeds to a step 58 at which, when the next cycle of the routine is executed, the operation SW=SW−SWP1 is performed in order to maintain the relation ODR=SD. Thereafter, the output duty ratio signal ODR=SD is delivered to the lock-up solenoid to place the lock-up clutch in the predetermined slip state.

If the step 56 is selected, namely if it is determined that a shift has ended, the sweep ratio SWP2 for when the lock-up clutch is directed toward the engaged (ON) state is read in, SW=SW+SW2 is evaluated and the output duty ratio ODR is made SD+SW. This is followed by a step 59, at which it is determined whether ODR has attained the standby duty ratio PD. If PD has not been attained, a signal is delivered as the output duty ratio ODR to the lock-up solenoid at the step 61, so that the lock-up clutch is swept in the engaging direction. Each time this loop is executed at a fixed time interval, the sweep ratio SWP2 is added to perform the operation SW=SW+SWP2. When ODR attains the standby duty ratio PD at the step 59, the program proceeds to a step 62 at which the lock-up clutch is placed in the fully engaged state.

Figure 7:
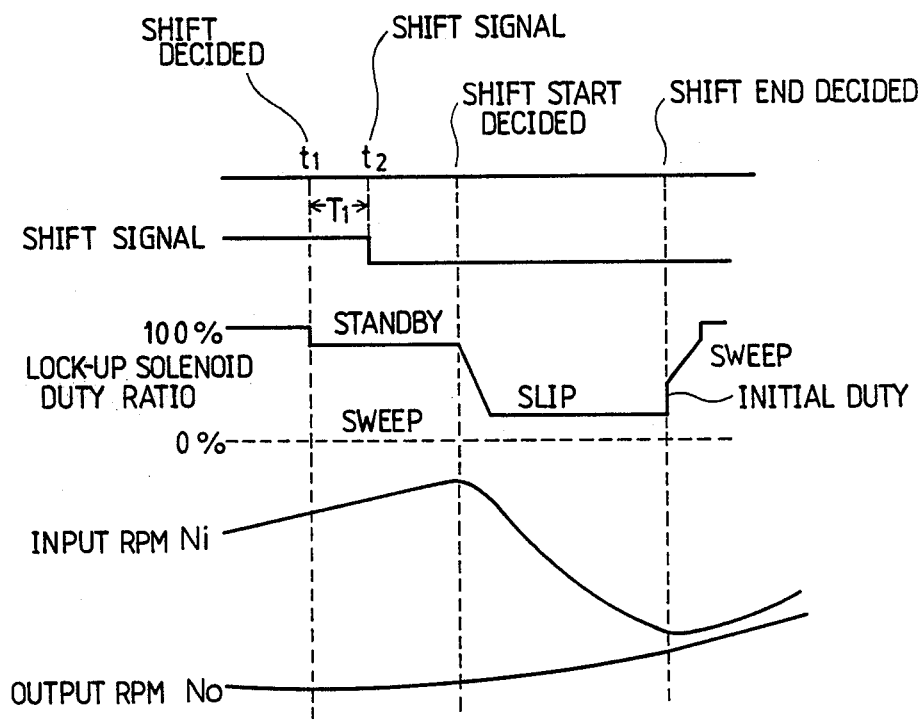
FIG. 7 is a view for describing the operating states of the lock-up clutch.
Figure 8:
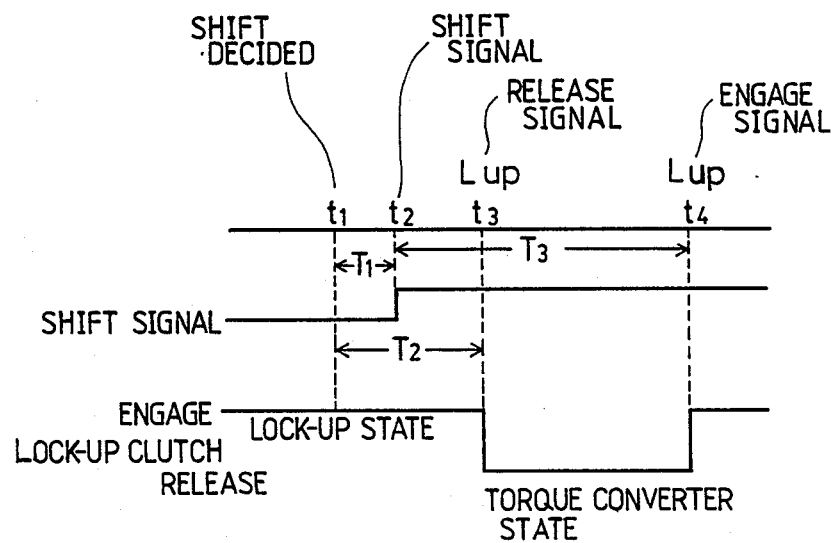
FIGS. 8 -10 show prior systems for eliminating or absorbing speed change shock.
Figure 9:
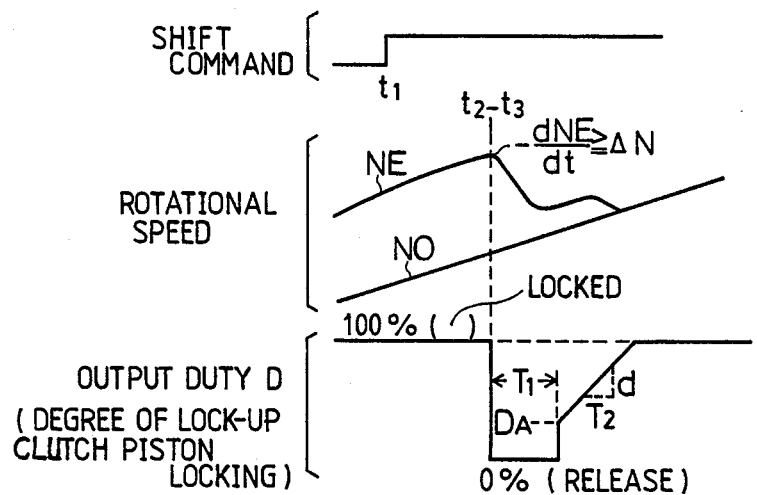
Figure 10:
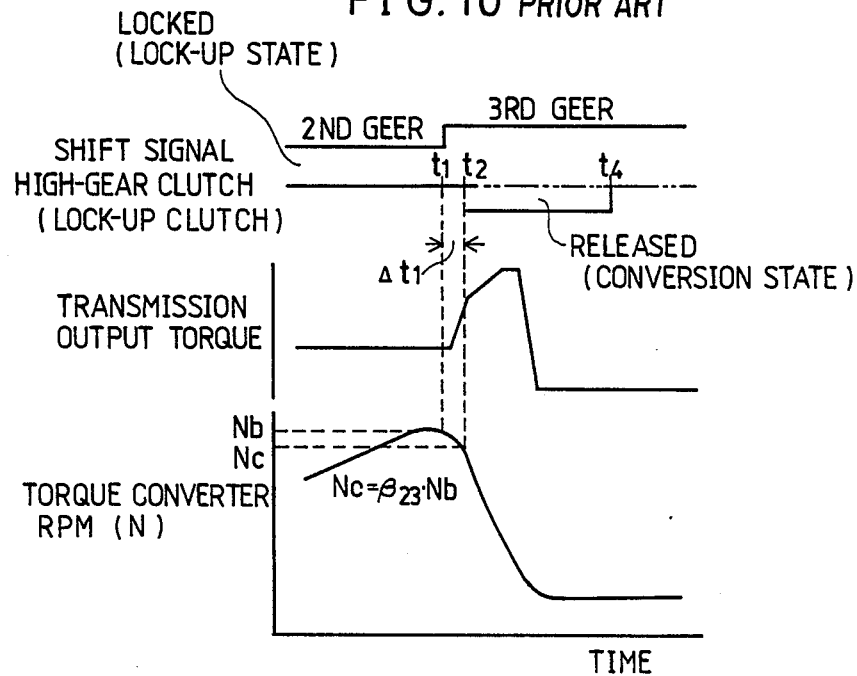

The operation of the lock-up clutch will now be described with reference to FIG. 7. At a time $t_1$, a shift is determined to have taken place, the output duty ratio ODR is made the standby duty ratio PD corresponding to the throttle opening, and a signal is delivered to the lock-up solenoid, whereby the lock-up clutch is made to standby in a state in which it may be operated in the release direction at any time. Next, at a time $t_2$ which follows the time $t_1$ by a period T1, a shift signal is applied to the shift solenoid, though an actual shift does not yet take place due to a delay in the response of the hydraulic system. When the start of a shift is determined to have taken place at the step 34 in FIG. 5, a signal is delivered to the lock-up solenoid at the output duty ratio ODR described in connection with the step 55 of FIG. 6, whereby the lock-up clutch is swept in the release direction. When the output duty ratio attains the slip duty ratio SD, the output duty ratio signal ODR=SD is delivered to the lock-up solenoid, whereby the lock-up clutch is placed in the predetermined slip state. Thereafter, when the end of a shift is determined at the step 36, the lock-up clutch is swept in the engaging direction from the initial duty ratio BD. When the standby duty ratio PD is attained, the lock-up clutch is placed in the fully engaged state. In the case of the embodiment described in connection with FIGS. 3 and 4, the arrangement is such that the lock-up clutch is released by making the output duty ratio of the lock-up solenoid 0% immediately after the start of a shift is determined, and engaged by making the output duty ratio of the lock-up solenoid 100% immediately after the end of a shift is determined.

INDUSTRIAL APPLICABILITY

The automatic transmission with the lock-up clutch in accordance with the invention is installed in a vehicle and is applied for the purpose of enhancing the feeling of a gear shift operation.

What is claimed is:

1. An automatic transmission equipped with a lock-up clutch capable of transmitting engine power to the automatic transmission directly or via a torque converter, characterized by comprising: detecting means for detecting an input rotational speed and an output rotational speed of the transmission, shift start determination means for judging start of a shift by comparing a ratio of the input rotational speed to the output rotational speed with a gear ratio prevailing prior to a shift, shift end determination means for judging end of a shift by comparing the ratio of the input rotational speed to the output rotational speed with a gear ratio prevailing after a shift, and a lock-up solenoid responsive to output signals from said shift start determination means and said shift end determination means for releasing the lock-up clutch during a shift.

2. An automatic transmission equipped with a lock-up clutch capable of transmitting engine power to the automatic transmission directly or via a torque converter, characterized by comprising: detecting means for detecting an input rotational speed and an output rotational speed of the transmission, shift start determination means for judging start of a shift by comparing a ratio of the input rotational speed to the output rotational speed with a gear ratio prevailing prior to a shift, shift end determination means for judging end of a shift by comparing the ratio of the input rotational speed to the output rotational speed with a gear ratio prevailing after a shift, and a lock-up solenoid responsive to output signals from said shift start determination means and said shift end determination means for controlling the lock-up clutch so that the lock-up clutch is capable of assuming a standby state, sweep state or slip state during a shift.

* * * * *